United States Patent Office

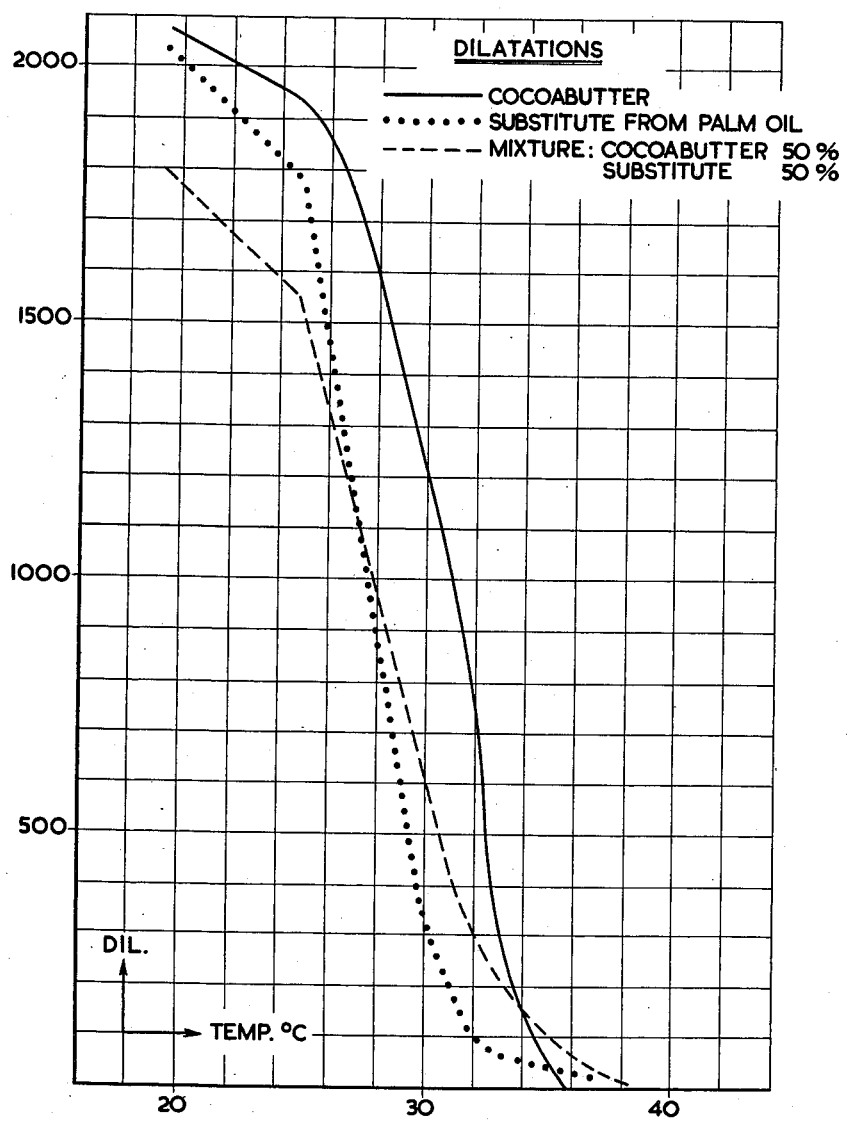

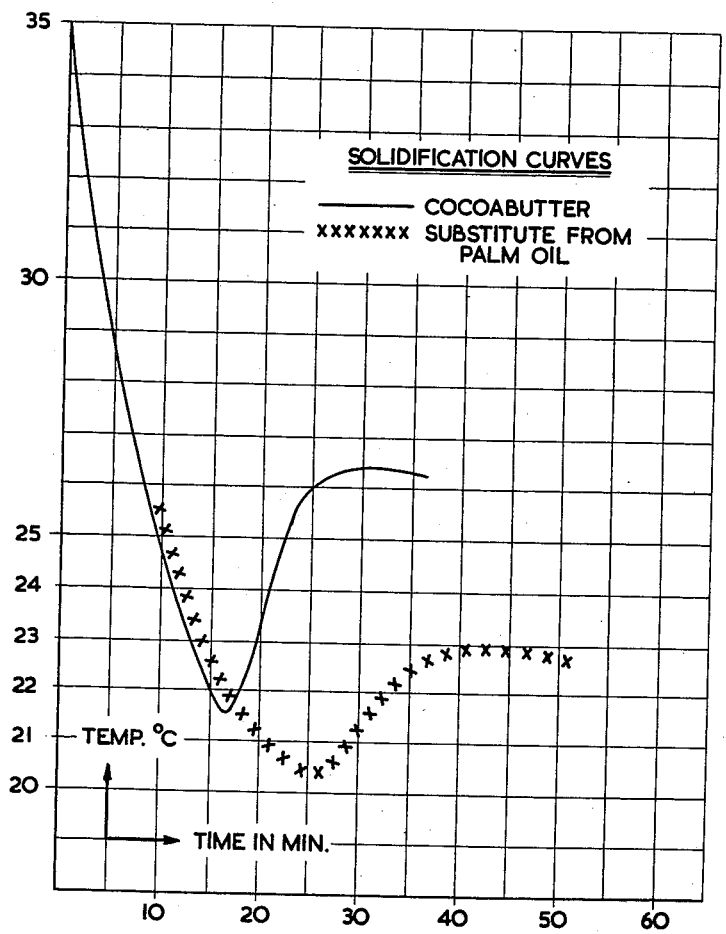

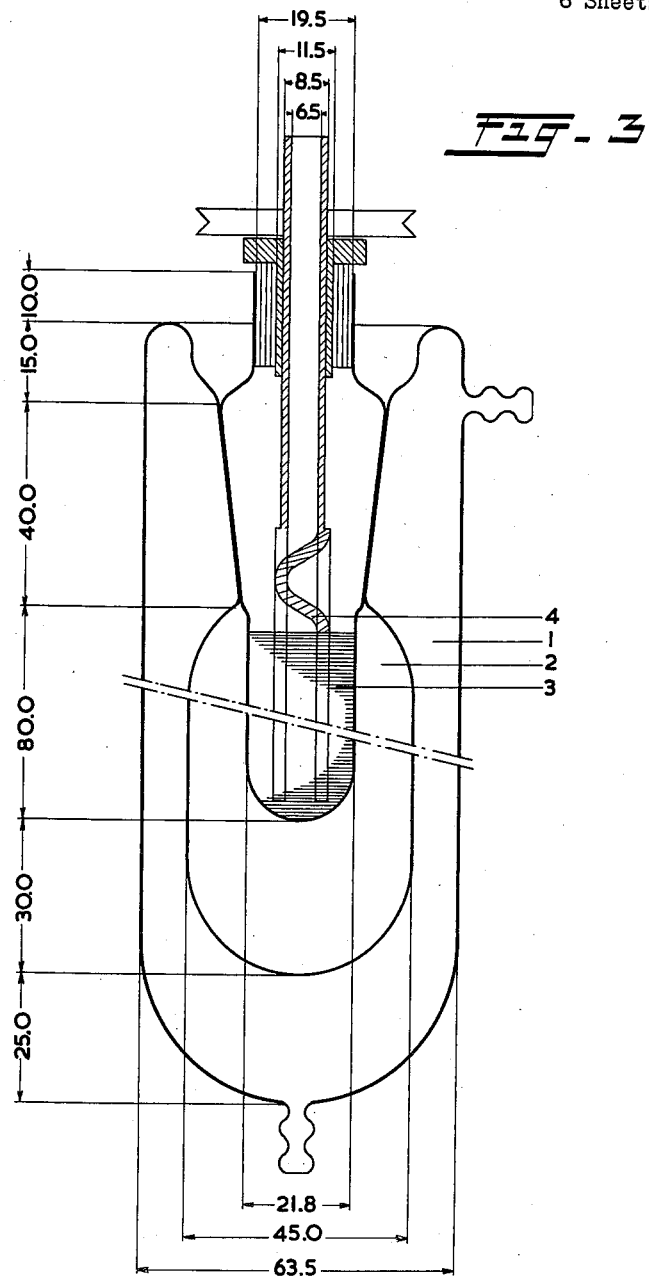

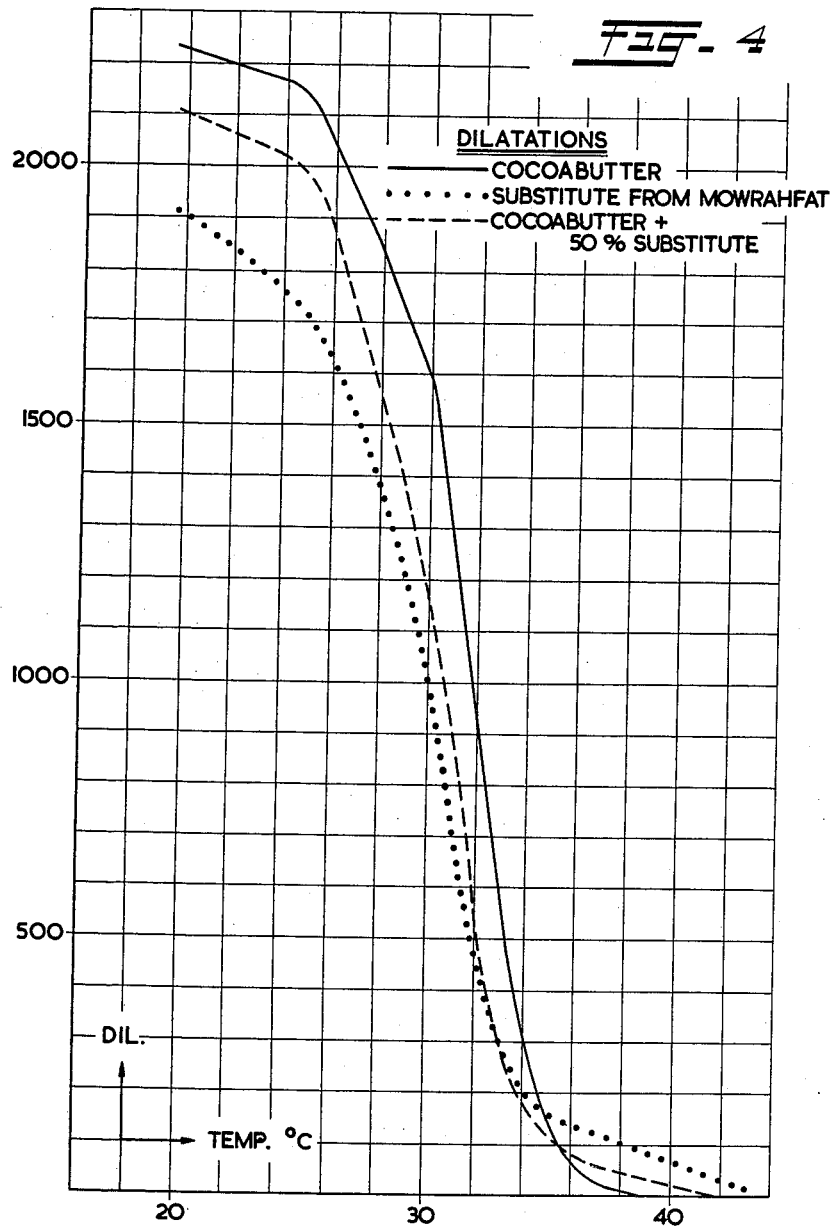

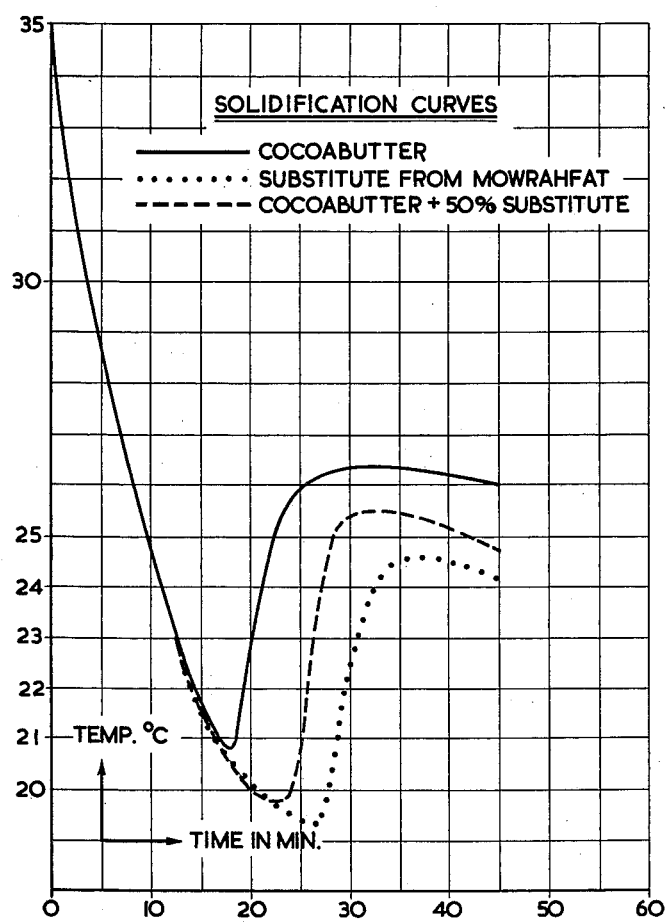

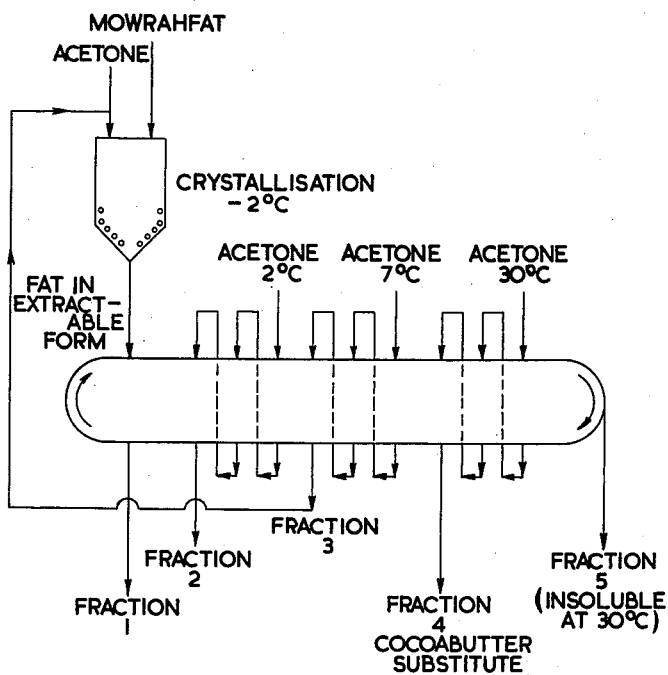

3,070,445
Patented Dec. 25, 1962

3,070,445
PROCESS FOR THE PREPARATION OF A COCOA BUTTER SUBSTITUTE AS WELL AS FOR THE PREPARATION OF CHOCOLATE AND THE SHAPED PRODUCTS THUS OBTAINED
Yde A. Sinnema, Koog aan de Zaan, Netherlands, assignor to N.V. Twincon, Koog-Zaandijk, North Holland, Netherlands, a corporation of the Netherlands
Filed May 9, 1960, Ser. No. 27,849
Claims priority, application Netherlands May 13, 1959
8 Claims. (Cl. 99—118)

The invention relates to the preparation of a cocoa butter substitute which, apart from the taste, the smell, and the colour, resembles cocoa butter very closely in its properties, while a mixture of the substitute in any proportion with cocoa butter has properties which lie, as desired, entirely or almost entirely between those of the substitute and those of cocoa butter.

Among naturally occurring fats cocoa butter occupies an exceptional position because it is solid and hard at room temperature, in consequence of which it is not fatty to the touch, while it melts readily and completely below body temperature. Owing to this melting behaviour, which is exceptionally short for fats, it melts readily in the mouth. It is due to these unusual properties that cocoa butter is eminently suitable for the preparation of chocolate. In view of this as well as the comparatively small production of cocoa butter it was always expensive as compared with other fats. On this account cocoa butter has long been replaced entirely or partially by cheaper fats, while attempts are constantly being made to improve the latter.

In the first instance naturally occurring fats, such as palm oil, palm kernel fat, Shea butter, Mowrah fat, Borneo tallow were taken for this purpose. Among these fats, Borneo tallow is an excellent cocoa butter substitute, whose properties are almost equal to those of cocoa butter. Palm kernel fat has a melting point in the neighbourhood of that of cocoa butter, but it contains a high percentage of esters of lauric acid, which are not present in cocoa butter. Moreover it has a low iodine value. The other fats at room temperature are oils containing some solid fat. Their iodine value is high, for palm oil higher than 50, for the other fats higher than 60. In view of these properties, apart from Borneo tallow, only 1 to 2% of these fats can be added to cocoa butter if divergent properties are to be avoided.

Numerous attempts have since been made to obtain a fat having better properties, which would admit of being added to cocoa butter in larger amounts. The principal methods for the preparation of these fats are:

(a) Partial hardening of oils, such as ground nut oil, coconut oil, whale oil.

(b) Elaidinization of fats, such as palm oil, with selenium, for instance, as catalyst.

(c) Interesterification of fats, which may or may not be followed by fractional crystallization from solvents.

(d) Fractional crystallization of fats from solvents.

By the methods referred to sub (a), (b), and (c) the fats were modified in such a way that though they did sometimes have a melting point, an iodine value, or a saponification value which was approximately equal to that of cocoa butter, addition of increasing percentages to cocoa butter gave rise to a divergency of their solidifying and melting characteristics from those of cocoa butter increasing to a maximum. In view of this it was still impossible to add more than small percentages of these fats if divergency of their properties from those of cocoa butter was to be avoided.

The cocoa butter substitute which is obtained from a vegetable fat such as palm oil by fractional crystallization by the process described in the German patent application DAS 1,030,668 consists as to more than 70% of dipalmito-oleo triglycerides. This appears from the fatty acid analysis of this substitute, of which the percentage of palmitic acid is about 55% and the percentage of stearic acid about 7%, as well as from the paper by T. P. Hilditch and L. Maddison in J. Soc. Chem. Ind., 59, 67–71 (1940), Table II on p. 68, where again by fractional crystallization from palm oil the same product with the same iodine value is prepared as the one referred to as cocoa butter substitute in the above mentioned German application. With this fractionation the palm oil fraction consists as to 60.1% of palmitic acid and as to 5.3% of stearic acid, while the percentage of dipalmito-oleo triglycerides is about 80, as appears from Table III on p. 69. The fraction which in this case has to serve as cocoa butter substitute, however, has a lower dilatation at 20° C. than cocoa butter (i.e. is less hard), while the dilatation between 1500 and 500 is reached at a temperature 3° C. lower than with cocoa butter. Moreover the properties of the mixtures of the substitute with cocoa butter do not under all conditions lie between those of the substitute and those of cocoa butter (FIGURE 1). The solidification curves of cocoa butter and of the substitute from palm oil are shown in FIG. 2.

In the preparation of a cocoa butter substitute from hog lard, according to the German patent application DAS 1,030,159, from hog lard there is obtained, by fractional crystallization from acetone, a mono-unsaturated glyceride fraction which has to serve as a cocoa butter substitute and which according to Table 89A on p. 320 of the book of T. P. Hilditch, The Chemical Constitution of Natural Fats, ed. 1949, consists as to more than 75% of stearylpalmityl-oleyl triglycerides.

Cocoa butter too consists as to more than 50% of triglycerides of palmitic, stearic, and oleic acids (see p. 249 of the above mentioned book of T. P. Hilditch), but the composition of these triglycerides is obviously different from the composition of the triglycerides which are obtained from hog lard, since with a mixture of the hog lard fraction with cocoa butter a very marked lowering of the dilatation curve is obtained, as appears from the following table:

| samples of fats | dilatations at— | | | | | |
| --- | --- | --- | --- | --- | --- | --- |
| | 20° C. | 25° C. | 30° C. | 32° C. | 34° C. | 36° C. |
| hog lard fraction with iodine value of 35.4 | 2,040 | 2,030 | 1,820 | 1,690 | 1,400 | 1,000 |
| mixture: 75% of cocoa butter, 25% of hog lard fraction | 1,680 | 1,250 | 330 | 100 | 20 | 0 |
| cocoa butter | 2,040 | 1,920 | 1,230 | 750 | 160 | 0 |

When the mono-unsaturated glyceride fraction from hog lard is mixed with cocoa butter, a considerable lowering of the melting point thus takes place, so that the distribution of the fatty acids over the $\alpha$- and $\beta$-positions in the hog lard fraction is different from that in cocoa butter, in view of which this fraction is not suitable to serve as a satisfactory cocoa butter substitute. In this connection reference may be made to the paper by D. Chapman c.s. in J. Chem. Soc. (1957), p. 1502, from which it appears that the palmityl-oleyl-stearyl glycerides in cocoa butter are $\beta$-oleyl triglycerides and those in hog lard are $\beta$-palmityl triglycerides.

Chocolate is usually made by addition of sugar and cocoa butter (or a cocoa butter substitute) to cocoa mass containing about 50% of cocoa butter. Even if one were to make chocolate from cocoa powder "poor in fat," which contains about 10% of cocoa butter, and cocoa butter substitute alone, this would still contain a mixture of cocoa butter and substitute.

The changes in the properties of cocoa butter brought about by addition of substitute are thus of primary importance for the appreciation of the quality of the substitute. If the cocoa butter substitute is satisfactory, the properties of a mixture of it with cocoa butter in any given proportion will have to lie between those of the substitute and those of cocoa butter, while the properties of the substitute as such have to be substantially equal to those of cocoa butter.

Now the invention relates to the preparation of a cocoa butter substitute of the type referred to above.

In order to define the term "equal to cocoa butter" more precisely, both for the dilatations at some temperatures and for the solidification points, twenty different samples of cocoa butter, with the exception of Brazilian cocoa butter, were examined.

Of these samples the dilatations at 20° C. averaged 2075, at 25° C. 1960, and at 30° C. 1330. A chance of 0.95 of this value being exceeded was found for cocoa butter with a dilatation at 20° C. of 1950, at 25° C. of 1800, and at 30° C. of 1000. The solidification point for these samples of cocoa butter averaged 26.3° C., while a solidification point of 25.9° C. had a chance of 0.95 of this value being exceeded. Now substitutes substantially equal to cocoa butter will be considered to be those with a dilatation higher than 1800 at 20° C., higher than 1500 at 25° C., and higher than 800 at 30° C., while the solidification point has to be above 23° C.

The determination of the dilatation, which may be supposed to be generally known, was effected according to the D.G.F. Einheitsmethoden C–IV 3e (1957), via standardized stabilization of the fats.

The solidification curves were determined with the aid of the apparatus shown in FIGURE 3 (scale 1:1). It comprises a jacket 1 cooled by water of 15° C., which encloses a solidification tube 3, filled with 15.0 g. of fat, which tube is invariably placed in the same way in the cooling jacket by means of a ground-glass joint. Between the solidification tube and the water jacket an air jacket 2 is present. Fitted in the axis of the tube is a thermometer the mercury bulb of which is in the centre of the column of fat. Revolving round it at a rate of 180 r.p.m. is the mechanical helical stirrer 4. Observation is started when the temperature of the fat is exactly 35° C.; this is the commencing point of the determination. When in the cooling process the lowest temperature has been reached, the stirring is stopped. The highest temperature which is thus reached owing to the rise of temperature is referred to as the solidification point.

The process for the preparation of the cocoa butter substitute according to the invention is characterized in that from Mowrah fat, which is generally obtained from seeds of Bassia (Madhuca) latifolia, Bassia longifolia, and Bassia butyracea, and which preferably has been deacidified previously, at least 60% of the weight as lowest-melting fraction is removed by fractionation with a total quantity of 2 to 20 l. of acetone per kg. of fat at a temperature between 0 and 12° C., in the form of an acetonic solution, as a result of which a fat fraction remains which mainly consists of mono-unsaturated triglycerides.

The highest-melting fraction, which is obtained in this way in a yield of 25–38% and has to serve as a cocoa butter substitute has the following dilatations: at 20° C. higher than 1200, but preferably higher than 1800; at 25° C. higher than 1000, but preferably higher than 1500; at 30° C. higher than 300, but preferably higher than 800.

The fraction in question has a solidification point which is higher than 20° C., but preferably higher than 23° C., while its iodine value is lower than 45, but preferably lower than 40.

The fraction in question consists almost entirely of palmityl-oleyl-stearyl triglycerides. The fatty acids in this fraction are distributed over the $\alpha$- and $\beta$-positions of the triglycerides in such a way that the structure of the fat, unlike the mono-unsaturated glyceride fraction from hog lard, is actually equal to the structure of the glycerides in cocoa butter, since a mixture of the mono-unsaturated glyceride fraction from Mowrah fat with 50% of cocoa butter gives no lowering of the dilatations, but values lying between those of the components, as appears from FIGURE 4. From FIGURE 5 it appears that the solidification curve of the mixture also lies between those of the component fats (Mowrah fraction and cocoa butter).

The structures of the palmityl-oleyl-stearyl triglycerides, which are present as to more than 50% in cocoa butter and as to more than 80% in the Mowrah fraction, will therefore be equal in the two cases.

A summary of the fatty acid compositions, in percent, of the cocoa butter substitutes from Mowrah fat and palm oil, as compared with that of cocoa butter, is given in the following table:

| fatty acid | substitute from Mowrah fat | cocoa butter | substitute from palm oil acc. to DAs 1,030,668 |
|---|---|---|---|
| palmitic acid | 26–26 | 24 | 55–60 |
| oleic acid+linoleic acid | 42–36 | 40 | 38–35 |
| stearic acid | 32–38 | 36 | 7–5 |

From the above it therefore appears that the triglyceride composition of the fraction from Mowrah fat, which has to serve as a cocoa butter substitute, differs in a marked way from the conventional cocoa butter substitutes. Moreover the Mowrah fat fraction in question resembles cocoa butter so closely as regards composition and fatty acid composition that with cocoa butter it gives mixtures the properties of which lie between those of the substitute and those of cocoa butter, which hitherto was the case with none of the conventional cocoa butter substitutes, with the exception of Tenkawang fat.

The fractionation is intended to separate off from Mowrah fat the mono-unsaturated triglyceride fraction in as pure a state as possible, i.e. in such a way that a minimum of di- and tri-unsaturated and completely saturated triglycerides is present in this fraction.

Although by means of fractional crystallization it is also possible to obtain a fraction which is suitable to be used as a cocoa butter substitute, fractional extraction is preferred. The procedure for this is as follows:

Mowrah fat, in the presence or absence of acetone, is brought into a solid or semi-solid, extractable condition and is subsequently extracted once or several times at the same or at increasing temperatures between 0 and 12° C. with a total quantity of acetone two to twenty times that of the fat, the extract containing the low-melting fraction (fraction 1) of the fat is removed, and the residue of the extraction(s) is extracted once or several times at the same or at increasing temperatures between 12 and 35° C. with a total quantity of acetone equal to up to fifteen times that of the Mowrah fat, and the cocoa butter substitute is obtained by evaporation from this extract (these extracts), while the residue (fraction 3) consists substantially of unsaponifiable constituents.

It is advisable to extract the fat, after it has been brought into an extractable condition, in one or several stages at about 4° C. and at about 7° C. with two to five litres of acetone per kg. of fat.

The separation into fractions is sharper in extraction than in crystallization, i.e. when the fat is separated into mono-unsaturated and di-unsaturated triglyceride fractions, for instance, these fractions can be obtained in a purer state by extraction than by crystallization. In fact, crystallization always involves supersaturation of the less soluble (higher-melting) fraction, which crystallizes at a given moment. In this crystallization at the same time a certain percentage of the better soluble (lower-melting) fraction is occluded in the crystal and thus gets into the precipitate. The extent of the supersaturation depends on the cooling rate, in the sense that the supersaturation is greater with rapid than with slow cooling.

In view of this, the cooling in fractional crystallization should always take place slowly. Since under the same conditions the degree of supercooling is greater at one time than at another, fluctuations are apt to occur in the yield and the properties of the substitute fraction.

The advantage of fractional extraction over fractional crystallization is that at a given temperature the lower-melting fraction dissolves much more rapidly in acetone than does the higher-melting fraction, in consequence of which the lower-melting glyceride fraction can be removed from the higher-melting fraction in a short time, while at the same time the latter fraction is obtained in a purer stater than in crystallization.

Furthermore the extraction process is much better suited for continuous operation than the crystallization process.

Mowrah fat contains 1 to 2% of unsaponifiable material. This can be removed very easily by extraction, since at the end of extraction at 30° C. it remains behind as an insoluble substance, whereas in the case of crystallization this substance, which should preferably be removed, is very difficult or impossible to separate from the fat.

The fat can be brought into an extractable condition by finely dividing it. This can be effected by slowly crystallizing the fat with 1–2 ml. of solvent per gram, to about 0° C., as a result of which a slurry is formed, or by slowly crystallizing the fat as such until a slurry has been formed, from which, after it has been poured out on a smooth cold plate, a hard layer can be removed, so that flakes are formed.

EXAMPLE I 302.7 g. of deacidified Mowrah fat (crude Mowrah fat contained 12.3% of free fatty acids, iodine value 63.5) was dissolved in 450 ml. of practically dry acetone by heating to 35° C. The solution was cooled, while slowly stirring, at a rate of about 2° C. per 15 minutes to +2° C. In consequence a large portion of the fat crystallized. To the crystal mass 900 ml. of acetone of about 0° C. was now added, upon which the crystal mass was extracted for about 1 hour at 4° C. The crystal mass was then filtered with the aid of Büchner funnel cooled to 4° C. The extract (filtrate) contained 124.7 g.=41.2% of oil, with an iodine value of 73.8.

The crystal mass was subsequently extracted with 900 ml. of acetone by stirring (the mass) for 30 minutes at 7° C. The crystal mass was filtered off and then extracted for a further 30 minutes at this temperature with 540 ml. of acetone. After filtration, the two extracts were combined. The mixture contained 82.5 g.=27.3% of oil, with an iodine value of 69.5.

Upon this the crystal mass was extracted for 90 minutes at 25° C. with 750 ml. of acetone. After filtration, the mass was once again extracted for 90 minutes at this temperature with 250 ml. of acetone.

After filtration, the two extracts (filtrates) were combined. The mixture contained 86.5 g.=28.6% of fat, with an iodine value of 38.8.

The solid fraction was again extracted with, for 30 minutes at 30° C., 150 ml. of acetone. After filtration, the filtrate was found to contain 0.9 g.=0.3% of fat, with an iodine value of 24.5. After evaporation of the acetone the extraction residue was 3.5 g.=1.2%, with an iodine value of 123.9, and consisted of unsaponifiable constituents.

The fraction with an iodine value of 38.8, which was obtained in a yield of 28.6%, is the desired cocoa butter substitute. It is also possible to obtain a mono-unsaturated glyceride fraction by fractional crystallization of Mowrah fat from acetone, as is shown by Example II, which fraction is a suitable cocoa butter substitute.

EXAMPLE II 401.1 g. of deacidified Mowrah fat (containing in the crude state 12.3% of free fatty acid, iodine value 63.5) with 0.17% of free fatty acid was dissolved in 2,000 ml. of practically dry acetone.

The solution was cooled, while slowly stirring, at a rate of about 2° C. per 15 minutes to 0° C. In consequence a portion of the fat crystallized. The crystal mass was filtered off with the aid of a cooled double-walled Büchner funnel, and washed subsequently with a small amount of cold acetone. The filtrate contained 188.6 g.=47% of oil, with an iodine value of 72.5–73.1.

The crystal fraction (244.8 g.) was dissolved in 2,200 ml. of acetone, while heating to 39° C. The solution was again crystallized, while slowly stirring, by cooling at a rate of 2 to 3° C. per 15 minutes to 7° C. The crystal mass was filtered off, as a result of which a filtrate was obtained which contained 90.8 g.=22.6%, with an iodine value of 62.9. After evaporation of the adhering acetone, the crystal fraction was 110.1 g.=27.4% with an iodine value of 38.0.

A second crystallization under approximately identical conditions yielded 124.6 g.=31.3% of this crystal fraction, with an iodine value of 40.2.

Melting point determination:
    31.3° C. incipient melting
    31.9° C. vaselinelike consistency
    32.8° C. molten, cloudy
    36.8° C. molten, clear This last mentioned fraction is the desired cocoa butter substitute.

EXAMPLE III

*Fractional Extraction of Mowrah Fat on a Filter*

167 g. of deacidified Mowrah fat was dissolved in twice the quantity of dry acetone. The solution, which was not quite clear, was cooled, while slowly stirring, at a rate of about 1° C. per 5 minutes to −2° C. The crystal mass was then filtered through a double-walled Büchner funnel, which was also cooled to −2° C. After evaporation of the acetone, the filtrate yielded 68.2 g. of oil=40.7%, with an iodine value of 76.5.

The Büchner funnel with the crystal mass was next put on a double-walled glass cylinder, fitted with a cock at the bottom. The Büchner funnel and the cylinder were kept at a constant temperature by circulation of cooling water.

During the extractions at increasing temperatures the circulating water was regularly brought to a higher temperature.

The extraction at 2° C. was effected by bringing 170 ml. of acetone of 2° C. on the crystall mass, the temperature of the funnel and the cylinder also being 2° C., upon which it was slowly filtered with a small difference of pressure. In about 1 minute the solvent was filtered through the crystal mass. This treatment was repeated 7 times at the same temperature. Upon this the temperature was raised and the procedure was repeated at this higher temperature (7° C., for instance).

A schematic summary of the experiment is given in the following table:

*Fractional Extraction of 167 g. of Mowrah Fat*

| fraction | temp., °C. | quantity of acetone in ml. | number of washings | weight of extract in g. | yield in percent | iodine value |
|---|---|---|---|---|---|---|
| | crystallization | | | | | |
| 1 | −2 | 340 | | 68.2 | 40.7 | 67.5 |
| | extraction | | | | | |
| 2 | 2 | 170 | 7× | 11.8 | 7.0 | 65.7 |
| 3 | 7 | 340 / 340 | 7× / 7× | 25.3 | 15.1 | 62.7 |
| 4 | 30 | 170 / 170 | 7× / 4× | 59.1 | 35.3 | 38.9 |
| 5 | insoluble | | | 1.4 | 0.8 | |

The fraction with an iodine value of 38.9, which was obtained by extraction at 30° C., in a yield of 35.3%, is the cocoa butter substitute in question.

Since the duration of one washing is only 1 minute and 32 washings are required for the complete fractional extraction, the whole extraction process can be carried out in about half an hour, so that this method apart from the better separation between the fractions, can be carried out considerably more rapidly than the classical fractional crystallization.

That this type of fractionation, in contrast to the fractionation by crystallization, can very easily be carried out continuously may appear from the diagram of FIG. 6, where the fat is placed in extractable condition on a horizontal belt extractor.

The crystals are subsequently extracted at increasing temperatures by bringing the extract on the crystals again at a given temperature and causing it to circulate.

EXAMPLE IV

Preparation of chocolate in which cocoa butter has been replaced as to nearly one half by cocoa butter substitute:

Composition—
  28 g. of cocoa powder (10% of fat)
  20 g. of substitute fat
  21 g. of cocoa butter
  56 g. of powdered sugar Chocolate of this composition, which is prepared in the same way as chocolate in which exclusively cocoa butter has been incorporated, in comparison with the latter gives an excellent product as regards hardness, melting characteristics, formation of "bloom," etc.

What I claim is:

1. A cocoa butter substitute from Mowrah fat, which substitute, when mixed with cocoa butter in any given proportion gives a mixture the properties of which, including solidification point, dilatations, and iodine value, lie between those of the substitute and those of cocoa butter comprising a mono-unsaturated triglyceride fraction of Mowrah fat obtained by removing from said Mowrah fat at least 60% of the weight thereof of the lowest-melting fraction by fractionation with a total quantity of 2 to 20 liters of acetone per kg. of said fat at a temperature between 0 and 12° C., in the form of an acetonic solution whereby said cocoa butter substitute which mainly comprises mono-unsaturated triglycerides remains.

2. A process for the preparation of a cocoa butter substitute from Mowrah fat, which substitute, when mixed with cocoa butter in any given proportion gives a mixture the properties of which including solidification point, dilatations, and iodine value, lie between those of the substitute and those of cocoa butter comprising the steps of, conditioning said Mowrah fat into a solid to semi-solid, extractable condition; and removing from the resulting conditioned Mowrah fat at least about 60% of the weight thereof of the lowest-melting fraction by extraction with a total quantity of 2 to 20 liters of acetone per kg. of said fat at a temperature between 0 and 12° C., in the form of an acetonic solution whereby said cocoa butter substitute which mainly comprises mono-unsaturated triglycerides remains.

3. A process for the preparation of a cocoa butter substitute from Mowrah fat, which substitute, when mixed with cocoa butter gives a mixture, the properties of which, including solidification point, dilatations, and iodine value, lie between those of the substitute and those of cocoa butter, comprising the steps of, conditioning said Mowrah fat into solid to semisolid, extractable condition; subjecting the resulting conditioned Mowrah fat to at least one low-temperature extraction with a total of about 2 to about 20 liters of acetone per kg. of said fat at a temperature of about 0 to 12° C. to provide a first fat fraction mainly comprising mono-unsaturated triglycerides as residue; and subjecting said first fat fraction to at least one subsequent extraction with a total quantity of acetone equal to up to about 15 liters per kg. of said Mowrah fat at a temperature between about 12 and about 35° C. resulting in an extract containing said cocoa butter substitute.

4. A process according to claim 2, characterized in that said Mowrah fat is fractionated by extraction in at least one stage of about 4° C. and at about 7° C. with two to five liters of acetone per kg. of fat.

5. A process according to claim 2, characterized in that said fat fraction contains an unsaponifiable solid glyceride portion which is separated by dissolving said fat fraction in acetone and separating the resulting solution from said unsaponifiable portion which remains undissolved.

6. A process according to claim 3, characterized in that said low-temperature extraction is conducted in at least one stage at a temperature of about 4° C. and about 7° C. with two to five liters of acetone per kg. of said fat per stage.

7. A chocolate product containing the cocoa butter substitute claimed in claim 1.

8. In a process for preparing chocolate products from cocoa butter, that improvement comprising, substituting the cocoa butter substitute claimed in claim 1 for at least a portion of said cocoa butter.

References Cited in the file of this patent

UNITED STATES PATENTS 2,903,363    Farr _____ Sept. 8, 1959

FOREIGN PATENTS 217,590    Australia _____ May 2, 1957
589,947    Canada _____ Dec. 29, 1959

OTHER REFERENCES

"Cocoa Butter-Like Fats from Domestic Oils," by Feuge et al., The Journal of the American Oil Chemists' Society, May 1958, vol. XXXV, No. 5, pp. 194–199.

"Industrial Oil and Fat Products," second edition, by Bailey, Interscience Publishers, Inc., New York, 1951, pp. 138–142.